United States Patent
Barrick et al.

(10) Patent No.: US 11,154,002 B2
(45) Date of Patent: Oct. 26, 2021

(54) SYSTEM AND METHOD FOR CONTROLLING THE OPERATION OF AN AGRICULTURAL IMPLEMENT BASED ON DETERMINED SOIL MOISTURE CONTENT

(71) Applicant: CNH Industrial America, LLC, New Holland, PA (US)

(72) Inventors: Christopher Barrick, Morton, IL (US); Tracey D. Meiners, Mackinaw, IL (US)

(73) Assignee: CNH Industrial America LLC, New Holland, PA (US)

( * ) Notice: Subject to any disclaimer, the term of this patent is extended or adjusted under 35 U.S.C. 154(b) by 362 days.

(21) Appl. No.: 16/260,457

(22) Filed: Jan. 29, 2019

(65) Prior Publication Data
US 2020/0236836 A1     Jul. 30, 2020

(51) Int. Cl.
*A01B 79/00* (2006.01)
*G06Q 50/02* (2012.01)
*A01G 25/16* (2006.01)

(52) U.S. Cl.
CPC .......... *A01B 79/005* (2013.01); *A01G 25/167* (2013.01); *G06Q 50/02* (2013.01)

(58) Field of Classification Search
CPC ..... A01B 79/005; A01B 47/00; A01B 49/027; G06Q 50/02; A01G 25/167
See application file for complete search history.

(56) References Cited

U.S. PATENT DOCUMENTS 5,919,242 A    7/1999   Greatline et al.
7,313,478 B1   12/2007  Anderson et al.
(Continued)

FOREIGN PATENT DOCUMENTS

CN    103927685    7/2014
CN    105117967    12/2015
(Continued)

OTHER PUBLICATIONS

Chatterjee, Sankhadeep et al., Soil Moisture Quantity Pediction Using Optimized Neural Supported Model for Sustainable Agricultural Applications, ElSevier—Sustainable Computing: Informatics and Systems (2018), Sep. 12, 2018 (8 pages).
(Continued)

*Primary Examiner* — Richard M Camby
(74) *Attorney, Agent, or Firm* — Rebecca L. Henkel; Rickard K. DeMille (57) ABSTRACT

In one aspect, a system for controlling the operation of an agricultural implement may include an agricultural implement configured to perform an agricultural operation on a field as the implement is moved across the field. A controller of the system configured to receive data indicative of a plurality of field characteristics of the field. The controller may also be configured to determine first and second soil moisture content values of the soil within the field at first and second depths below a field surface of the field based on the received data, respectively. Additionally, the controller may be configured to initiate adjustment of an operating parameter of the agricultural implement based on the determined the first soil moisture content value and the determined second soil moisture content value.

16 Claims, 3 Drawing Sheets

(56) References Cited

U.S. PATENT DOCUMENTS

| | | | |
|---|---|---|---|
| 9,009,087 B1 | 4/2015 | Mewes et al. | |
| 9,292,796 B1 | 3/2016 | Mewes et al. | |
| 9,519,861 B1 | 12/2016 | Gates et al. | |
| 9,651,536 B1* | 5/2017 | Lund | A01C 21/00 |
| 9,880,537 B2 | 1/2018 | Mewes et al. | |
| 10,096,073 B2 | 10/2018 | Groeneveld | |
| 10,524,430 B1* | 1/2020 | Nervino | G01N 33/246 |
| 10,939,604 B2* | 3/2021 | Sporrer | A01B 76/00 |
| 10,945,388 B1* | 3/2021 | Nervino | A01G 27/008 |
| 2017/0067869 A1* | 3/2017 | Lund | G01N 33/246 |
| 2017/0090068 A1 | 3/2017 | Xiang et al. | |
| 2018/0184576 A1* | 7/2018 | Sauder | G05B 15/02 |
| 2018/0238823 A1* | 8/2018 | Puhalla | G01N 27/221 |
| 2018/0239044 A1* | 8/2018 | Rhodes | G01N 27/223 |
| 2018/0267008 A1 | 9/2018 | Sutton | |
| 2020/0068778 A1* | 3/2020 | Schoeny | A01B 63/24 |
| 2020/0113122 A1* | 4/2020 | Pomedli | A01B 79/005 |
| 2020/0116479 A1* | 4/2020 | Shearer | A01B 49/027 |

FOREIGN PATENT DOCUMENTS

| | | |
|---|---|---|
| CN | 105825230 | 8/2016 |
| WO | WO 2016118685 | 7/2016 |
| WO | WO 2016118686 | 7/2016 |
| WO | WO 2016183182 | 11/2016 |
| WO | WO 2017042843 | 3/2017 |

OTHER PUBLICATIONS

Hosseini, Reza et al., Statistical Modeling of Soil Moisture, Integrating Satellite Remote-Sensing (SAR) and Ground-Based Data, MDPI: Remote Sensing, 2015 (29 pages).

* cited by examiner

SYSTEM AND METHOD FOR CONTROLLING THE OPERATION OF AN AGRICULTURAL IMPLEMENT BASED ON DETERMINED SOIL MOISTURE CONTENT

FIELD OF THE INVENTION

The present disclosure generally relates to agricultural implements and, more particularly, to systems and methods for controlling the operation of an agricultural implement being moved across a field based on soil moisture content values determined at a plurality of depths within the field.

BACKGROUND OF THE INVENTION

It is well known that, to attain the best agricultural performance from a field, a farmer must cultivate the soil, typically through a tillage operation. Modern farmers perform tillage operations by pulling a tillage implement behind an agricultural work vehicle, such as a tractor. Tillage implements typically include a plurality of ground-engaging tools, such as harrow discs, shanks, leveling discs, tines, rolling baskets, and/or the like, which loosen and/or otherwise agitate the soil to prepare the soil for subsequent planting operations.

The moisture content of the soil within the field is an important parameter when determining the desired penetration depth of the ground-engaging tools for a tillage operation. However, it is typically difficult for tillage implement operators to accurately determine the soil moisture content of the field. Furthermore, differing soil and crop conditions across the field and/or other factors may cause the soil moisture content to vary at different locations within the field. As such, many operators rely on experience or instinct when setting the penetration depth of the tools, which may result in poor seedbed quality. Such poor seedbed conditions can, in turn, result in a subsequent loss in the crop yield, such as due to poor germination and/or non-uniform plant stands.

Accordingly, an improved system and method for controlling the operation of an agricultural implement would be welcomed in the technology. In particular, a system and method for controlling the operation of an agricultural implement based on the moisture content of the soil within the field at a plurality of depths below the field surface would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a system for controlling the operation of an agricultural implement. The system may include an agricultural implement configured to perform an agricultural operation on a field as the agricultural implement is moved across the field. Furthermore, the system may also include a controller configured to receive data indicative of a plurality of field characteristics of the field. The controller may also be configured to determine a first soil moisture content value of the soil within the field at first depth below a field surface of the field based on the received data. Moreover, the controller may be configured to determine a second soil moisture content value of the soil within the field at second depth below the field surface, with the second depth being different than the first depth based on the received data. Additionally, the controller may be configured to initiate adjustment of an operating parameter of the agricultural implement based on the determined the first soil moisture content value and the determined second soil moisture content value.

In another aspect, the present subject matter is directed to a method for controlling the operation of an agricultural implement. The method may include receiving, with a computing device, data indicative of a plurality of field characteristics of a field across which the agricultural implement is being moved. The method may also include determining, with the computing device, a first soil moisture content value of the soil within the field at a first depth below a field surface of the field based on the received data. Furthermore, the method may include determining, with the computing device, a second soil moisture content value of the soil within the field at a second depth below the field surface based on the received data, with the second depth being different than the first depth. Additionally, the method may include initiating, with the computing device, adjustment of an operating parameter of the agricultural implement based on the determined first soil moisture content value and the determined second soil moisture content value.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for controlling the operation of an agricultural implement. Specifically, in several embodiments, as the agricultural implement is being moved across a field, a controller of the disclosed system may be configured to receive data associated with a plurality of characteristics of the field. Such field characteristic data may, in turn, be indicative of the moisture content of the soil within the field at various soil depths. For example, the field characteristics may include one or more soil characteristics (e.g., soil type, soil water storage capacity, and/or the like), field condition characteristics (e.g., weed cover, residue cover, and/or the like), crop characteristics (e.g., crop type, crop population, and/or the like) and/or weather characteristics (e.g., precipitation, wind, and/or the like). Based on the received field characteristic data, the controller may be configured to determine moisture content values of the soil within the field at a plurality of different depths below the field surface. Thereafter, the controller may be configured to initiate adjustment of one or operating parameters of the agricultural implement based on the determined soil moisture content values. For example, in one embodiment, the controller may be configured to initiate adjustment of the penetration depth(s) of one or more ground-engaging tool(s) (e.g., a disc blade(s), a tillage shank(s), and/or the like) of the implement based on the determined soil moisture content values.

Figure 1:
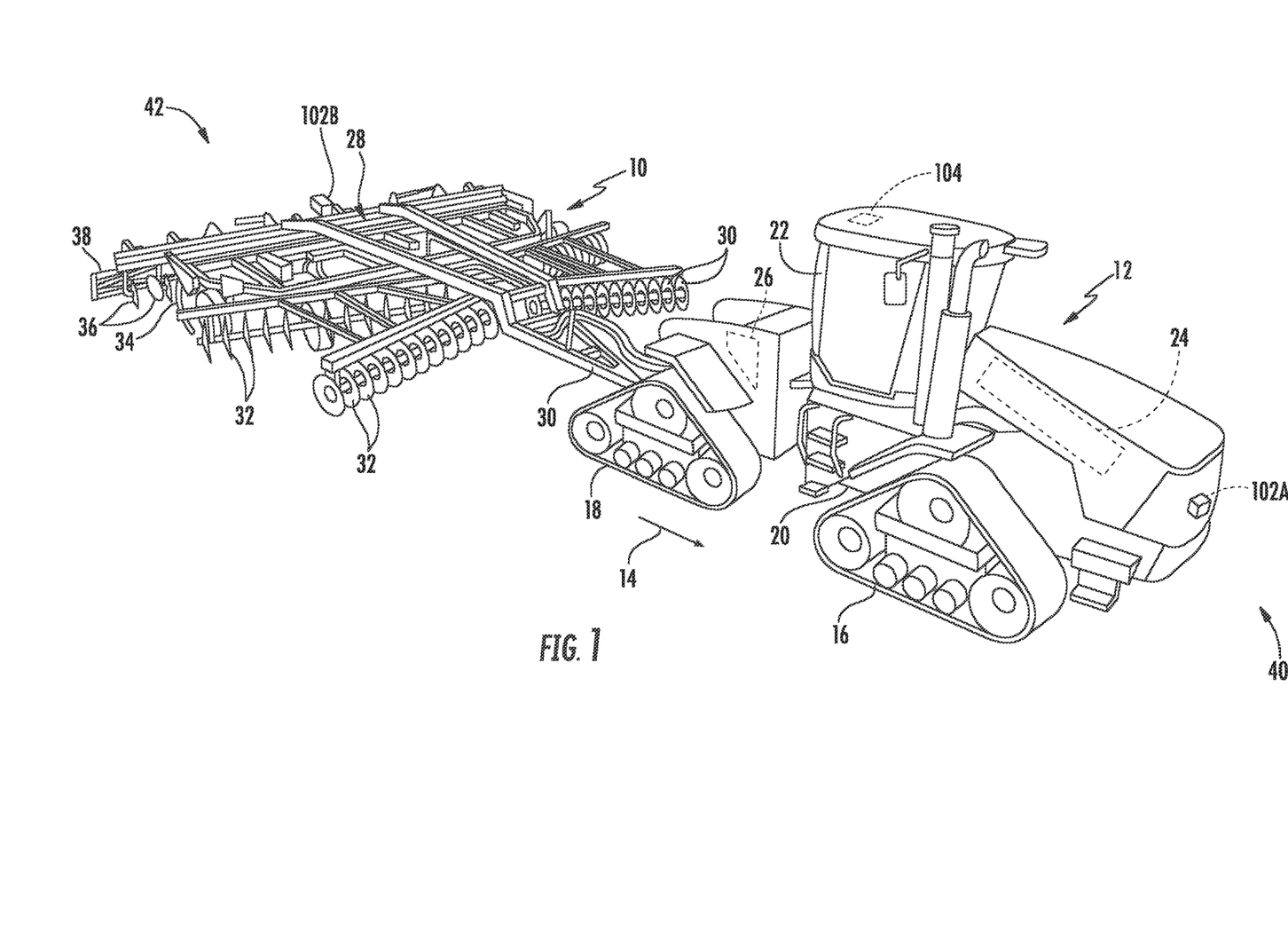
FIG. 1 illustrates a side view of one embodiment of an agricultural implement coupled to an associated work vehicle in accordance with aspects of the present subject matter.

Referring now to drawings, FIG. 1 illustrates a perspective view of one embodiment of an agricultural implement 10 coupled to an associated work vehicle 12 in accordance with aspects of the present subject matter. In general, the implement 10 may be configured to be towed across a field in a direction of travel (e.g., as indicated by arrow 14 in FIG. 1) by the vehicle 12. As shown, in the illustrated embodiment, the implement 10 is configured as a tillage implement (e.g., a disc harrow), and the vehicle 12 is configured as an agricultural tractor. However, in other embodiments, the implement 10 may be configured as any other suitable type of implement, such as a planter, seeder, fertilizer, and/or the like. Similarly, the vehicle 12 may be configured as any other suitable type of vehicle, such as an agricultural harvester, a self-propelled sprayer, and/or the like.

As shown in FIG. 1, the vehicle 12 includes a pair of front track assemblies 16, a pair or rear track assemblies 18, and a frame or chassis 20 coupled to and supported by the track assemblies 16, 18. An operator's cab 22 may be supported by a portion of the chassis 20 and may house various input devices for permitting an operator to control the operation of one or more components of the implement 10 and/or one or more components of the vehicle 12. Additionally, the vehicle 12 may include an engine 24 and a transmission 26 mounted on the chassis 20. The transmission 24 may be operably coupled to the engine 26 and may provide variably adjusted gear ratios for transferring engine power to the track assemblies 16, 18 via a drive axle assembly (not shown) (or via axles if multiple drive axles are employed).

Additionally, as shown in FIG. 1, the implement 10 may generally include a frame 28 configured to be towed by the vehicle 12 via a pull hitch or tow bar 30 in the direction of travel 14. In general, the frame 28 may be configured to support a plurality of ground-engaging tools, such as a plurality of shanks, disk blades, leveling blades, basket assemblies, tines, spikes, and/or the like. In one embodiment, the various ground-engaging tools may be configured to perform a tillage operation or any other suitable ground-engaging operation across the field along which the implement 10 is being towed. For example, in the illustrated embodiment, the frame 26 is configured to support various gangs of disc blades 32, a plurality of ground-engaging shanks 34, a plurality of leveling blades 36, and a plurality of crumbler wheels or basket assemblies 38. However, in alternative embodiments, the frame 28 may be configured to support any other suitable ground-engaging tool(s) or combinations of ground-engaging tools.

Furthermore, in several embodiments, the implement 10 and/or the vehicle 12 may include one or more vision-based sensors 102 coupled thereto and/or supported thereon. In general, each vision-based sensor 102 may be configured to capture image data and and/or other vision-based data from the field across Which the implement/vehicle 10/12 is traveling. As will be described below, the captured field data may be indicative of one or more characteristics of the field (e.g., a field condition characteristic(s), a crop characteristic(s), and/or the like). In this regard, the vision-based sensor(s) 102 may be provided in operative association with the implement 10 and/or the vehicle 12 such that the sensor(s) 102 has a field of view or sensor detection range directed towards a portion(s) of the field adjacent to the implement 10 and/or the vehicle 12. For example, as shown in FIG. 1, in one embodiment, one vision-based sensor 102A may be provided at a forward end 40 of the vehicle 12 to allow the sensor 102A to capture image data of a section of the field disposed in front of the vehicle 12. Similarly, as shown in FIG. 1, a second vision-based sensor 102B may be provided at or adjacent to an aft end 42 of the implement 10 to allow the sensor 102B to capture image data of a section of the field disposed behind the implement 10. However, in alternative embodiments, the vision-based sensors 102A, 102B may be installed at any other suitable location(s) on the implement 10 and/or the vehicle 12. Furthermore, only one vision-based sensor 102 may be mounted on either the implement 10 or the vehicle 12 or more than two vision-based sensors 102 may be mounted on one or both of the implement 10 and the vehicle 12.

It should be appreciated that the vision-based sensor(s) 102 may correspond to any suitable sensing device(s) configured to detect or capture image data or other vision-based data (e.g., point cloud data) associated with the portion of the soil surface or the plants present within an associated field of view. For example, in several embodiments, the vision-based sensor(s) 102 may correspond to a suitable camera(s) configured to capture images of the field, such as three-dimensional images of the soil surface or the plants present with in the associated field of view. For instance, in a particular embodiment, the vision-based sensor(s) 102 may correspond to a stereographic camera(s) having two or more lenses with a separate image sensor for each lens to allow the camera(s) to capture stereographic or three-dimensional images. However, in alternative embodiments, the vision-based sensor(s) 102 may correspond to Light Detection and Ranging (LIDAR) sensor(s) or any other suitable vision-based sensing device(s).

Moreover, a location sensor 104 may be provided in operative association with the implement 10 and/or the vehicle 12. For instance, as shown in FIG. 1, the location sensor 104 is installed on or within the vehicle 12. However, in other embodiments, the location sensor 104 may be installed on or within the implement 10. In general, the location sensor 104 may be configured to determine the exact location of the implement 10 and/or the vehicle 12 using a satellite navigation positioning system (e.g. a GPS system, a Galileo positioning system, the Global Navigation satellite system (GLONASS), the BeiDou Satellite Navigation and Positioning system, and/or the like). In such an embodiment, the location determined by the location sensor 104 may be transmitted to a controller(s) of the implement 10 and/or the vehicle 12 (e.g., in the form coordinates) and stored within the controller's memory for subsequent processing and/or analysis. For instance, based on the known dimensional configuration and/or relative positioning between the implement 10 and the vehicle 12, the determined location from the location sensor 104 may be used to geo-locate the implement 10 within the field.

It should be further appreciated that the configuration of the implement 10 and vehicle 12 described above and shown in FIG. 1 is provided only to place the present subject matter in an exemplary field of use. Thus, it should be appreciated that the present subject matter may be readily adaptable to any manner of machine configuration.

Figure 2:
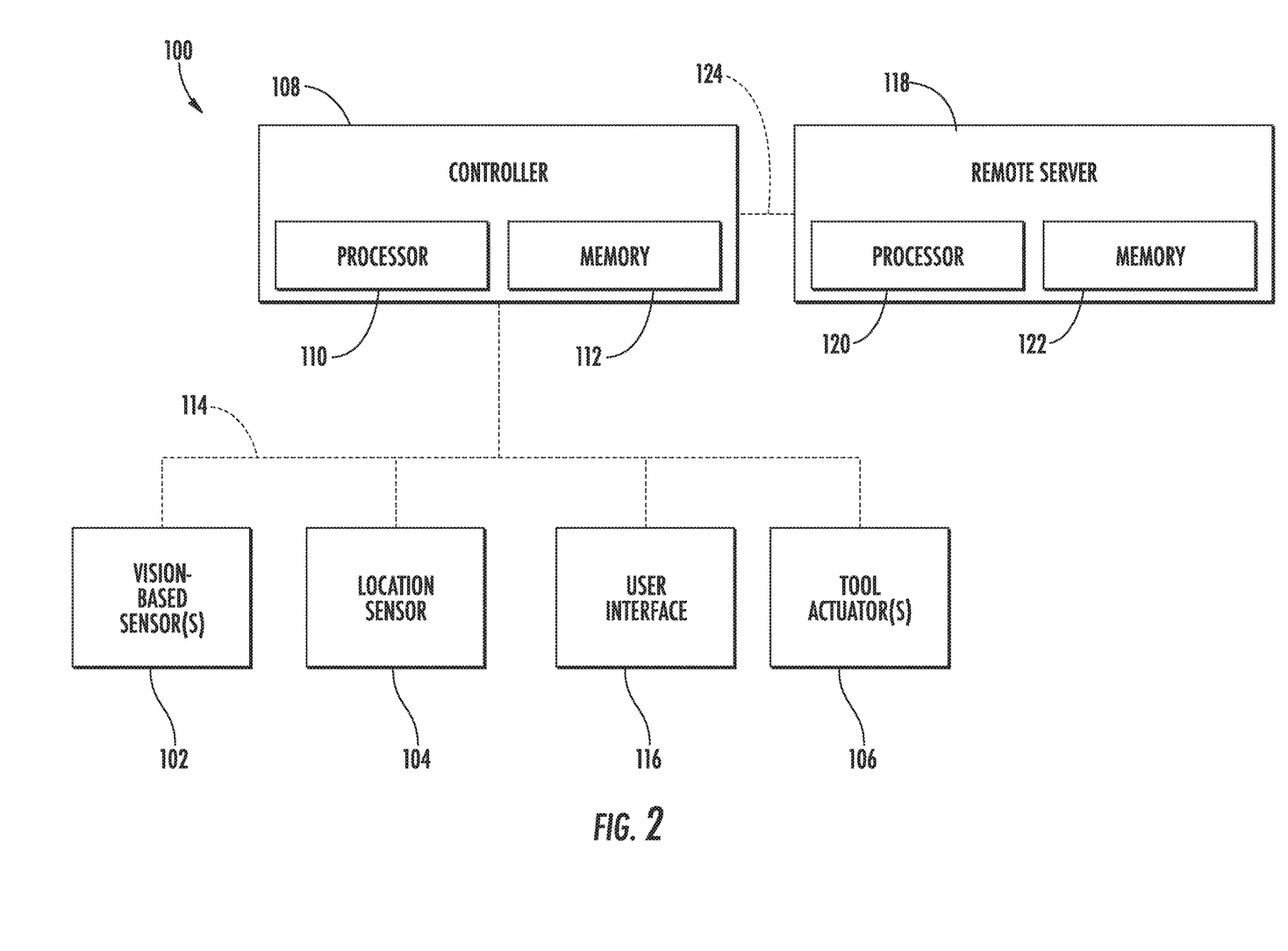
FIG. 2 illustrates a schematic view of one embodiment of a system for controlling the operation of an agricultural implement in accordance with aspects of the present subject matter.

Referring now to FIG. 2, a schematic view of one embodiment of a system 100 for controlling the operation of an agricultural implement is illustrated in accordance with aspects of the present subject matter. In general, the system 100 will be described herein with reference to the implement 10 and the vehicle 12 described above with reference to FIG. 1. However, it should be appreciated by those of ordinary skill in the art that the disclosed system 100 may generally be utilized with implements and/or vehicles having any other suitable machine configuration.

As shown in FIG. 2, the system 100 may include one or more tool actuators 106 of the implement 10. Specifically, each actuator 106 may be configured to adjust to the position or orientation of a ground-engaging tool of implement 10 (e.g., one of the gangs of disc blades 32, the shanks 34, the leveling blades 36, or the basket assemblies 38) relative to the implement frame 28. For example, in one embodiment, a first end of each actuator 106 (e.g., a rod of each actuator 106) may be coupled to the tool, while a second end of each actuator 106 (e.g., the cylinder of each actuator 106) may be coupled to the frame 28. The rod of each actuator 106 may be configured to extend and/or retract relative to the corresponding cylinder to adjust the position or orientation of the tool relative to the frame 28. In one embodiment, the actuator(s) 106 corresponds to a fluid-driven actuator(s), such as a hydraulic or pneumatic cylinder(s). However, in alternative embodiments, the actuator(s) 106 may correspond to any other suitable type of actuator(s), such as an electric linear actuator(s).

In accordance with aspects of the present subject matter, the system 100 may include a controller 108 positioned on and/or within or otherwise associated with the implement 10 or the vehicle 12. In general, the controller 108 may comprise any suitable processor-based device known in the art, such as a computing device or any suitable combination of computing devices. Thus, in several embodiments, the controller 108 may include one or more processor(s) 110 and associated memory device(s) 112 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 112 of the controller 108 may generally comprise memory element(s) including, but not limited to, a computer readable medium (e.g., random access memory (RAM)), a computer readable non-volatile medium (e.g., a flash memory), a floppy disc, a compact disc-read only memory (CD-ROM), a magneto-optical disc (MOD), a digital versatile disc (DVD), and/or other suitable memory elements. Such memory device(s) 112 may generally be configured to store suitable computer-readable instructions that, when implemented by the processor(s) 110, configure the controller 108 to perform various computer-implemented functions.

In addition, the controller 108 may also include various other suitable components, such as a communications circuit or module, a network interface, one or more input/output channels, a data/control bus and/or the like, to allow controller 108 to be communicatively coupled to any of the various other system components described herein (e.g., the vision-based sensor(s) 102, the location sensor 104, and/or the tool actuator(s) 106). For instance, as shown in FIG. 2, a communicative link or interface 114 (e.g., a data bus) may be provided between the controller 108 and the components 102, 104, 106 to allow the controller 108 to communicate with such components 102, 104, 106 via any suitable communications protocol (e.g., CAN-BUS).

It should be appreciated that the controller 108 may correspond to an existing controller(s) of the implement 10 and/or the vehicle 12, itself, or the controller 108 may correspond to a separate processing device. For instance, in one embodiment, the controller 108 may form all or part of a separate plug-in module that may be installed in association with the implement 10 and/or the vehicle 12 to allow for the disclosed systems to be implemented without requiring additional software to be uploaded onto existing control devices of the implement 10 and/or the vehicle 12. It should also be appreciated that the functions of the controller 108 may be performed by a single processor-based device or may be distributed across any number of processor-based devices, in which instance such devices may be considered to form part of the controller 108. For instance, the functions of the controller 108 may be distributed across multiple application-specific controllers, such as a navigation controller, an engine controller, an implement controller, and/or the like.

Furthermore, in one embodiment, the system 100 may also include a user interface 116. More specifically, the user interface 116 may be configured to provide feedback (e.g., feedback associated with soil moisture content of the field) to the operator of the implement/vehicle 10/12. As such, the user interface 116 may include one or more feedback devices (not shown), such as display screens, speakers, warning lights, and/or the like, which are configured to provide feedback from the controller 108 to the operator. The user interface 116 may, in turn, be communicatively coupled to the controller 108 via the communicative link 114 to permit the feedback to be transmitted from the controller 108 to the user interface 116. In addition, some embodiments of the user interface 116 may include one or more input devices (not shown), such as touchscreens, keypads, touchpads, knobs, buttons, sliders, switches, mice, microphones, and/or the like, which are configured to receive user inputs from the operator. In one embodiment, the user interface 116 may be mounted or otherwise positioned within the cab 22 of the vehicle 10. However, in alternative embodiments, the user interface 116 may mounted at any other suitable location.

Moreover, the system 100 may include a remote database server 118 configured to store data associated with one or more previously captured or determined characteristics (e.g., soil, field condition, crop, and/or weather characteristics) of the field across which the implement/vehicle 10/12 is traveling. In general, the remote database server 118 may comprise any suitable processor-based device known in the art, such as a computing device or any suitable combination of computing devices. Thus, in several embodiments, the remote database server 118 may include one or more processor(s) 120 and associated memory device(s) 122 configured to perform a variety of computer-implemented database server functions. Such memory device(s) 122 may generally be configured to store suitable computer-readable instructions that, when implemented by the processor(s) 120, configure the remote database server 118 to perform various computer-implemented database server functions.

Furthermore, the remote database server 118 may also include various other suitable components, such as a communications circuit or module, a network interface, one or more input/output channels, a data/control bus and/or the like, to allow remote database server 118 to be communicatively coupled to the controller 108. For instance, as shown in FIG. 2, a communicative link or interface 124 (e.g., a data bus) may be provided between the remote database server 118 and the controller 108 to allow the remote database server 118 and the controller 108 to communicate via any suitable communications protocol (e.g., Wi-Fi, 3G, 4G, LTE, and/or the like).

Additionally, it should be appreciated that the remote database server 118 may located at any suitable location that is remote or otherwise spaced apart from the implement 10 and the vehicle 12. For example, in one embodiment, the remote database server 118 may be located at a farm management office or facility. However, in alternative embodiments, the remote database server 118 may be located at any other suitable location.

In several embodiments, as the implement/vehicle 10/12 is traveling across the field, the controller 108 may be configured to receive or otherwise access data associated with a plurality of field characteristics of the field. Such field characteristic data may, in turn, be indicative of the moisture content of the soil within the field at various depths beneath the top surface of the field. In this regard, the controller 108 may be configured to receive the field characteristic data from one or more components of the system 100 as the implement/vehicle 10/12 travels across the field. For example, as indicated above, the system 100 may include a remote database server 118 configured to store previously-captured field characteristic data at a location(s) remote from the implement/vehicle 10/12. As such, the controller 108 may be configured to receive the field characteristic data stored within the remote database server 118 via the communicative link 124. Moreover, as indicated above, in one embodiment, one or more vision-based sensors 102 may be mounted on the implement 10 and/or the vehicle 12, with each sensor 102 configured to capture image data of a section of the field across which the implement/vehicle 10/12 is traveling. In such embodiment, the controller 108 may be configured to receive the image data captured by the vision-based sensor(s) 102 via the communicative link 114. As will be described below, the image data received from the vision-based sensor(s) 102 may, in turn, be processed/analyzed by the controller 108 to determine one or more characteristics or parameters of the field. Additionally, in further embodiments, the controller 108 may be configured to access previously-captured field characteristic data stored within its memory 112. However, in alternative embodiments, the controller 108 may be configured to receive field characteristic data from any other suitable source, such as another sensor of the implement/vehicle 10/12, another database server, and/or the like.

Furthermore, in several embodiments, the received field characteristic data may be geo-referenced to the current location of the implement/vehicle 10/12 within the field. In such embodiment, the field characteristic data stored in the remote database server 118 and/or the memory 112 of the controller 108 may be geo-referenced to specific locations within the field. For example, the field may be divided into a plurality of sections (e.g., thirty meters by thirty meters squares), with each section having associated field characteristic data. In this regard, as the implement/vehicle 10/12 travels across the field, the controller 108 may be configured to geo-locate the implement/vehicle 10/12 within the field based on the data (e.g., coordinates) received from the location sensor 104 (e.g., via the communicative link 114). As such, the controller 108 may be configured to determine the particular section of the field in which the implement/vehicle 10/12 is currently located based on the geo-located position of the implement/vehicle 10/12. Thereafter, the controller 108 may be configured to access the field characteristic data associated with such section of the field from its memory 112 and/or request such field characteristic data from the remote database server 118.

In one embodiment, the received field characteristic data may be indicative or otherwise associated within one or more soil characteristics of the field. For example, such soil characteristic(s) may include the type of soil within the field, such as the National Resources Conservation Service (NRCS) Soil Survey Geographic database (SSURGO) soil type. The soil type may, in turn, be indicative of how much moisture is retained by the soil after a precipitation or rainfall event as well as how quickly the soil dries out after such an event. The soil characteristic(s) may also include the water-holding capacity of the soil, such as the United States Department of Agriculture (USDA) available water storage (AWS) values. The AWS values may, in turn, be indicative of how much water the soil is capable of absorbing after a precipitation event. The controller 108 may receive the soil characteristic data from its memory 112 and/or the remote server database 118. However, in alternative embodiments, the soil characteristic(s) may include any other suitable characteristics or parameters associated with the soil in the field.

Moreover, the received field characteristic data may be indicative or otherwise associated with one or more field condition characteristics of the field. For example, such field condition characteristic(s) may include the slope or orientation of the field, with the slope being indicative of how quickly water runs off the field following a precipitation event (e.g., the greater the slope of the field, the less water that is absorbed by the field). The controller 108 may receive the slope data from its memory 112, the remote server database 118, and/or a gyroscope or other slope sensor (not shown) provided in association with the implement/vehicle 10/12.

The field condition characteristic(s) may also include the percent residue coverage of the field (residue coverage may slow the rate at which the soil dries out due to sunlight exposure), percent weed coverage (weeds may slow the rate at which the soil dries out due to sunlight exposure, but may also absorbs water present in the soil), and/or cover crop presence (cover crops may slow the rate at which the soil dries out due to sunlight exposure, but may also absorb water present in the soil). In one embodiment, as the implement/vehicle 10/12 travels across the field, the controller 108 may be configured to receive image data associated with the soil and/or plants within the field from the vision-based sensor(s) 102. Thereafter, the controller 108 may configured to analyze/process the received image data to determine to the residue coverage, weed coverage, and/or cover crop presence within the field at the current location of the implement/vehicle 10/12. In this regard, the controller 108 may include any suitable image processing algorithms stored within its memory 112 or may otherwise use any suitable image processing techniques to determine the residue coverage, weed coverage, and/or cover crop presence within the field based on the received image data. However, in alternative embodiments, the controller 108 may be configured to receive the residue coverage, weed coverage, and/or crop cover presence data from its memory 112, the remote database server 118, and/or any other suitable sensor(s) on the implement 10 and/or vehicle 12.

In addition, the field condition characteristic(s) may also include the type and/or nature of any tillage activities previously performed on the field, such as fall tillage, ripping, and/or the like. For example, previously tilled soil may store more moisture (e.g., due to its increased porosity) following a precipitation event than un-tilled soil. The controller 108 may receive such previously-performed tillage activity data from its memory 112 or the remote database server 118. However, in alternative embodiments, the field condition characteristic(s) may include any other suitable characteristics or parameters associated with the condition of the field.

Furthermore, the received field characteristic data may be indicative or otherwise associated with one or more characteristics of the crop present within the field. For example, such crop characteristic(s) may include the type and/or genetic characteristics of the crops present within the field. The crop type/genetics may, in turn, be indicative of how much moisture the crops can absorb from the soil. The crop characteristic(s) may also include the population, growth stage, and/or health of the crops within the field. In this regard, crops having larger populations, later growth stages, and/or better health may absorb more water from the soil, but may also provide more shade to slow the rate at which the sunlight dries out the soil. In one embodiment, the controller 108 may be configured to determine the crop characteristic(s) of the field based on the image data received from the vision-based sensor(s) 102 in a similar manner as described above with respect to the residue coverage, weed coverage, and cover crop presence data. Alternatively, the controller 108 may receive the crop characteristic(s) data from its memory 108 or the remote database server 118. Furthermore, in alternative embodiments, the crop characteristic(s) may include any other suitable characteristics or parameters associated with the crops present within the field.

Furthermore, the received field characteristic data may be indicative or otherwise associated with one or more weather characteristics experienced by the field. For example, the weather characteristic(s) may include the temperatures (warmer temperatures may cause the field to dry out quicker than cooler temperatures), sunlight exposure (more sunlight exposure may cause the field to dry out quicker than less sunlight exposure), and/or wind exposure (more wind exposure may cause the field to dry out quicker than less wind exposure), in addition, the weather characteristic(s) may include the amount, rate, and/or timing of any rainfall or other precipitation events experienced by the field. Such precipitation events may, in turn, be indicative of the amount of water has been provided to the field for absorption by the soil. The controller 108 may generally receive weather characteristic data from its memory 112 or the remote server database 118. In one embodiment, the weather characteristic data may be geo-referenced or otherwise localized to the field such that the weather characteristic data is indicative of the actual weather conditions experienced by the field and not at some remote location (e.g., a weather station at a local airport). However, in alternative embodiments, the weather characteristic(s) may include any other suitable characteristics or parameters associated with the weather experienced by the field.

In several embodiments, the controller 108 may be configured to determine a plurality of moisture content values of the soil within the field. More specifically, the controller 108 may be configured to receive data associated with a plurality of field characteristics as the implement/vehicle 10/12 travels across the field. Each individual field characteristic may, in turn, be indicative of the moisture content of the soil. Comparing a plurality of the received field characteristics may provide an indication of the moisture content of the soil across a range of different depths beneath the surface of the field. For example, the soil may dry from its top surface downward due to sunlight and wind exposure, from its middle depths due to water absorption by plant roots, and/or from its deeper depths due to water absorption into the subsoil or tile lines. As such, in one embodiment, the combination of the received data associated with sunlight exposure, wind exposure, crop type, cover crop presence, weed presence, and/or soil type in connection with the received precipitation data may be indicative of the soil moisture content at several different depths. In this regard, the controller 108 may be configured to analyze/process the received data to determine a soil moisture content value at a plurality of depths beneath the surface of the field. For instance, the controller 108 may include a look-up table(s), suitable mathematical formula, and/or algorithms stored within its memory 112 that correlates the received data to the soil moisture content at the various steps beneath the field surface.

It should be appreciated that the controller 108 may be configured to determine soil moisture content values at any suitable number depths beneath the field surface. For example, in one embodiment, the controller 108 may determine a first soil moisture content value at a first soil depth (e.g., one inch below the field surface) and a second soil moisture content value at a different, second soil depth (e.g., three inches below the field surface). In another embodiment, the controller 108 may determine the soil moisture content values at various depth intervals, such as at every 0.1 or 0.5 inches below the field surface. However, in alternative embodiments, the controller 108 may be configured to determine the soil moisture content values at any other suitable depths below the field surface.

Additionally, the controller 108 may be configured to generate a field map illustrating the soil moisture content values at a plurality of soil depths at various locations within the field. More specifically, as described above, the controller 108 may be configured to geo-locate the position of the implement 10 within the field and determine soil moisture content values at a plurality of soil depths as the implement 10 is being moved across the field. As such, the controller 108 may associate each determined soil moisture content value with the position in the field where the determination was made. Thereafter, the controller 108 may be configured to generate a field map (e.g., a graphical field map) illustrating the soil moisture content at various positions and depths within the field. For instance, the controller 108 may be configured to execute one or more algorithms stored within its memory 112 that generate the field map based on the determined soil moisture content values and the data received from the location sensor 104 (e.g., via the communicative link 114). In one embodiment, the controller 108 may be configured to transmit instructions to the user interface 116 (e.g., the communicative link 114) instructing the user interface 116 to display the field map (e.g., a graphical field map).

In accordance with aspects of the present subject matter, the controller 108 may be configured to initiate adjustment of one or more operating parameter of the implement 10 based on the determined the soil moisture content values. In general, it may be desirable for the field to have a particular water or moisture storage capacity to provide the desired amount of moisture to the root structures of the plants growing within the field. The amount of porosity within the soil may, in turn, affect the amount of water that the soil can store. Such porosity can be increased with a tillage operation. In this regard, the controller 108 may be configured to automatically adjust the penetration depth of the ground-engaging tools (e.g., the disc blades 32 and/or the shanks 34) of the implement 10 based on the determined soil moisture content values in a manner that provides the desired porosity or moisture content-holding capacity to the soil throughout the range of depths at which the crop roots may be present. As such, in one embodiment, the controller 108 may be configured to compare each determined moisture content values to a predetermined moisture content value range associated with the desired moisture content at the associated depth of the determined value. Thereafter, when the determined moisture content value at one or more depths below the field surface differs from the associated predetermined range, the controller 108 may be configured to initiate an adjustment of the penetration depth of the ground-engaging tools such that the soil porosity is adjusted. In such embodiment, the controller 108 may be configured transmit instructions to the tool actuator(s) 106 (e.g., via the communicative link 114) instructing the actuator(s) 106 to adjust the penetration depth(s) of the associated tool(s). For example, if it is determined that the soil moisture content at a first depth is within the predetermined range and the soil moisture content at a lower second depth is too low, the controller 108 may instruct the actuator(s) 106 to increase the penetration depth(s) the associated tools in a manner that provides increased tillage to the soil at the second depth.

Furthermore, in one embodiment, the controller 108 may be configured to initiate an adjustment of the penetration depth of the ground-engaging tools based on the determined soil moisture at various depths. In general, when preparing a seedbed using a tillage operation, it is typically desirable that the penetration depth of the ground-engaging tool(s) be slightly deeper than the intended planting depth when the soil moisture high to help dry and warm the soil in the seed zone (e.g., the soil around where the seeds are being planted). Conversely, when the soil is dry, it is generally desirable that the penetration depth of the ground-engaging tool(s) be slightly shallower than the intended planting depth to preserve the soil moisture in the seed zone. In such embodiment, the controller 108 may be configured to monitor the soil moisture content at several depths in the seed zone. Thereafter, the controller 108 may be configured transmit instructions to the tool actuator(s) 106 (e.g., via the communicative link 114) instructing the actuator(s) 106 to adjust the penetration depth(s) of the associated tool(s) penetration depth(s) of the tool(s) is slightly below the intended planting depth when the soil in the seed zone is wet and slightly above the intended planting depth when the soil in the seed zone is dry.

It should be appreciated that the controller 108 may be configured to adjust any other suitable operating parameter(s) of the implement 10 based on the determined moisture content values. For example, in embodiments where the implement 10 is configured as a planter or seeder, the controller 108 may be configured to adjust the depth of the furrow in which seeds are being dispensed (e.g., by adjusting the position of the disc opener(s) relative to the gauge wheel) such that the seeds are deposited at a depth below the field surface having the desired soil moisture content.

Furthermore, it should be appreciated that adjusting the operating parameter(s) of the implement 10 based on soil moisture content values at a plurality of depths beneath the field surface may provide one or more technical advantages. For example, the soil moisture content may differ that various depths below the field surface. In this regard, by knowing the soil moisture content at such depths, the controller 108 may be able to adjust the operating parameter(s) of the implement 10 in a more accurate manner. In addition, the controller 108 may be able to increase and/or decrease the penetration depth(s) of the ground-engaging tool(s) based on the soil moisture content at the various different penetration depths until the tool(s) is at a depth having the desired soil moisture content when tilling the soil and/or forming a furrow for seeds).

Figure 3:
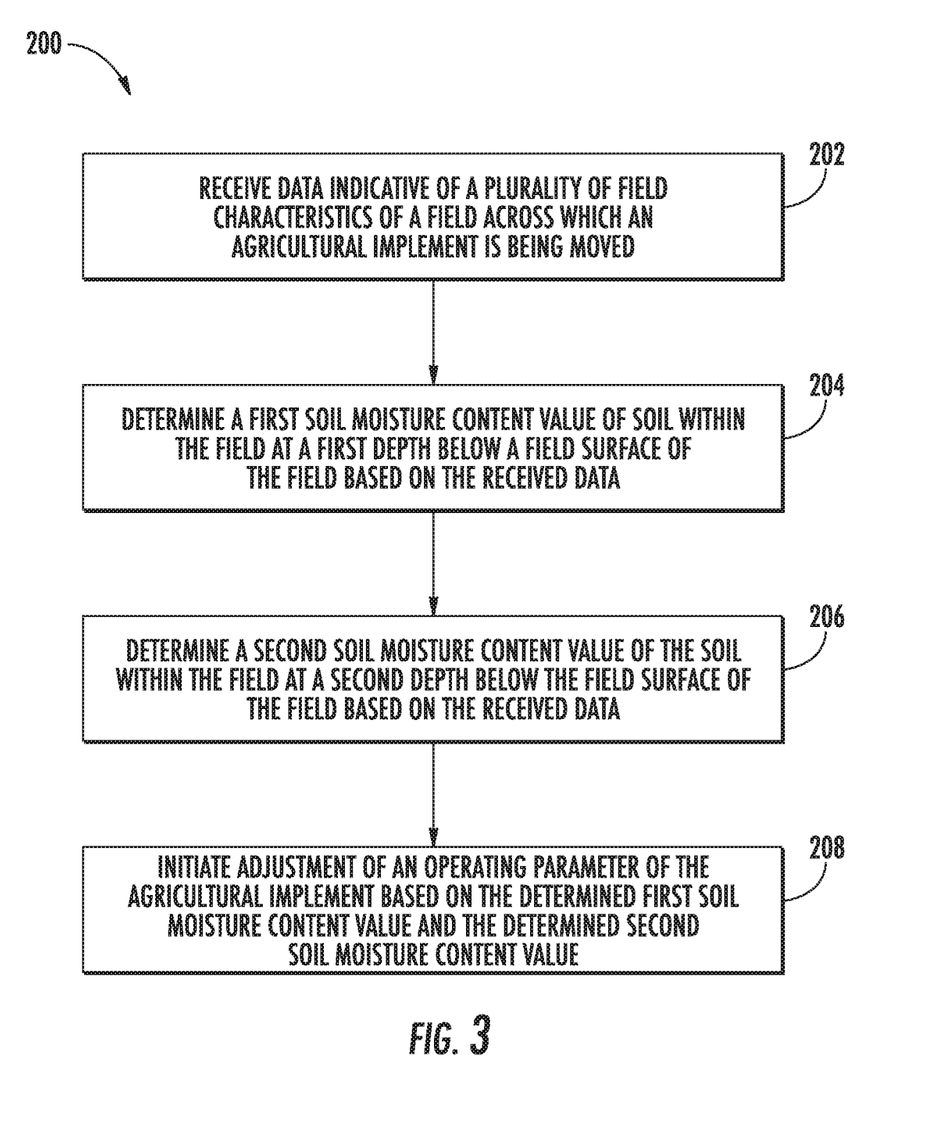
FIG. 3 illustrates a flow diagram of one embodiment of a method for controlling the operation of an agricultural implement in accordance with aspects of the present subject matter.

Referring now to FIG. 3, a flow diagram of one embodiment of a method 200 for controlling the operation of an agricultural implement is illustrated in accordance with aspects of the present subject matter. In general, the method 200 will be described herein with reference to the implement 10, the vehicle 12, and the system 100 described above with reference to FIGS. 1 and 2. However, it should be appreciated by those of ordinary skill in the art that the disclosed method 200 may generally implemented with any implement and/or vehicle having any suitable machine configuration and/or any system having any suitable system configuration. In addition, although FIG. 3 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 3, at (202), the method 200 may include receiving, with a computing device, data indicative of a plurality of field characteristics of a field across which an agricultural implement is being moved. For instance, as described above, the controller 108 may be configured to receive data indicative of a plurality of field characteristics of a field across which an agricultural implement 10 is being moved, such as from its memory 112, a vision-based sensor(s) 102, a remote database server 118.

Additionally, at (204), the method 200 may include determining, with the computing device, a first soil moisture content value of soil within the field at a first depth below a field surface of the field based on the received data. For instance, as described above, the controller 108 may be configured to determine a first soil moisture content value of soil within the field at a first depth below a field surface of the field based on the received data.

Moreover, as shown in FIG. 3, at (206), the method 200 may include determining, with the computing device, a second soil moisture content value of the soil within the field at a second depth below the field surface of the field based on the received data. For instance, as described above, the controller 108 may be configured to determine a second soil moisture content value of the soil within the field at a second depth below the field surface of the field based on the received data.

Furthermore, at (208), the method 200 may include initiating, with the computing device, adjustment of an operating parameter of the agricultural implement based on the determined first soil moisture content value and the determined second soil moisture content value. For instance, as described above, the controller 108 may be configured to initiate adjustment of one or more operating parameters of the agricultural implement based on the determined first and second soil moisture content values. Such operating parameter(s) may include the penetration depth(s) of one or more ground-engaging tools (e.g., disc blades 32 and/or shanks 34) of the implement 10.

It is to be understood that the steps of the method 200 are performed by the controller 108 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 108 described herein, such as the method 200, is implemented in software code or instructions which are tangibly stored on a tangible computer readable medium. The controller 108 loads the software code or instructions via a direct interface with the computer readable medium or via a wired and/or wireless network. Upon loading and executing such software code or instructions by the controller 108, the controller 108 may perform any of the functionality of the controller 108 described herein, including any steps of the method 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A system for controlling the operation of an agricultural implement, the system comprising:
   an agricultural implement configured to perform an agricultural operation on a field as the agricultural implement is moved across the field;
   a vision-based sensor configured to capture image data associated with a portion of the field; and
   a controller communicatively coupled to the vision-based sensor, the controller configured to:
      receive data indicative of a plurality of field characteristics of the field, wherein each field characteristic of the plurality of field characteristics comprises at least one of a soil characteristic of soil within the field, a field condition characteristic of the field, a crop characteristic of crops present within the field, or a weather characteristic of a weather event experienced by the field;
      determine a first soil moisture content value of the soil within the field at a first depth below a field surface of the field based on the received data;
      determine a second soil moisture content value of the soil within the field at a second depth below the field surface, the second depth being different than the first depth based on the received data; and
      initiate adjustment of an operating parameter of the agricultural implement based on the determined the first soil moisture content value and the determined second soil moisture content value;
      determine at least one of the field condition characteristic or the crop characteristic based on the image data received from the vision-based sensor.

2. The system of claim 1, wherein the controller is further configured to generate a field map identifying of the first soil moisture content value and the second soil moisture content value at a plurality of locations within the field.

3. The system of claim 1, wherein the agricultural implement comprises a ground-engaging tool configured to penetrate the field surface as the agricultural implement is moved across the field, the controller further configured to initiate adjustment of a penetration depth of the ground-engaging tool based on the determined first soil moisture content value and the determined second soil moisture content value.

4. The system of claim 3, further comprising:
   a location sensor configured capture data indicative of a location of the agricultural implement within the field, the controller communicatively coupled to the location sensor, the controller further configured to:
   determine the location of the agricultural implement within the field based on the data received from the location sensor; and
   initiate adjustment of the penetration depth of the ground-engaging tool based on the determined first soil moisture content value and the determined second soil moisture content value at the determined location of the agricultural implement.

5. The system of claim 1, wherein the soil characteristic comprises at least one of a soil type of the soil or a water holding capacity of the soil.

6. The system of claim 1, wherein the field condition characteristic comprises at least one of a slope of the field, a percent residue coverage of the field, a percent weed cover of the field, a presence of cover crops within the field, or a tillage operation previously-performed on the field.

7. The system of claim 1, wherein the crop characteristic comprises at least one of a type of the crops present within the field, a population of the crops present within the field, a growth stage of the crops present within the field, a health of the crops present within the field, or a genetic characteristic of the crops present within the field.

8. The system of claim 1, wherein the weather characteristic comprises at least one of a temperature characteristic, a precipitation characteristic, a sunlight characteristic, or a wind characteristic associated with the weather event.

9. A method for controlling the operation of an agricultural implement, the method comprising:
- receiving, with a computing device, data indicative of a plurality of field characteristics of a field across which the agricultural implement is being moved, wherein each field characteristic of the plurality of field characteristics comprises at least one of a soil characteristic of soil within the field, a field condition characteristic of the field, a crop characteristic of crops present within the field, or a weather characteristic of a weather event experienced by the field;
- determining, with the computing device, a first soil moisture content value of the soil within the field at a first depth below a field surface of the field based on the received data;
- determining, with the computing device, a second soil moisture content value of the soil within the field at a second depth below the field surface based on the received data, the second depth being different than the first depth;
- initiating, with the computing device, adjustment of an operating parameter of the agricultural implement based on the determined first soil moisture content value and the determined second soil moisture content value;
- receiving, with the computing device, image data associated with a portion of the field from a vision-based sensor; and
- determining, with the computing device, at least one of the field condition characteristic or the crop characteristic based on the received image data.

10. The method of claim 9, further comprising:
- generating, with the computing device, a field map identifying of the first moisture content value and the second soil moisture content value at a plurality of locations within the field.

11. The method of claim 9, wherein initiating adjustment of the operating parameter comprising initiating, with the computing device, adjustment of a penetration depth of a ground-engaging tool of the agricultural implement based on the determined first soil moisture content value and the determined second soil moisture content value.

12. The method of claim 11, further comprising:
- determining, with the computing device, a location of the agricultural implement within the field based on data received from a location sensor, and
- wherein initiating adjustment of the penetrating depth comprises initiating, with the computing device, adjustment of the penetration depth of the ground-engaging tool based on the determined first soil moisture content value and the determined second soil moisture content value at the determined location of the agricultural implement.

13. The method of claim 9, wherein the soil characteristic comprises at least one of a soil type of the soil or a water holding capacity of the soil.

14. The method of claim 9, wherein the field condition characteristic comprises at least one of a slope of the field, a percent residue coverage of the field, a percent weed cover of the field, a presence of cover crops within the field, or a tillage operation previously-performed on the field.

15. The method of claim 9, wherein the crop characteristic comprises at least one of a type of the crops present within the field, a population of the crops present within the field, a growth stage of the crops present within the field, a health of the crops present within the field, or a genetic characteristic of the crops present within the field.

16. The method of claim 9, wherein the weather characteristic comprises at least one of a temperature characteristic, a precipitation characteristic, a sunlight characteristic, or a wind characteristic associated with the weather event.

* * * * *